(12) United States Patent
Roesler et al.

(10) Patent No.: US 7,135,505 B2
(45) Date of Patent: Nov. 14, 2006

(54) RADIATION CURABLE COATINGS BASED ON URETDIONE POLYISOCYANATES

(75) Inventors: Richard R. Roesler, Wexford, PA (US); Katherine M. Ratliff, Ambridge, PA (US); Catherine M. Britsch, Pittsburgh, PA (US); Charles A. Gambino, McDonald, PA (US)

(73) Assignee: Bayer Materialscience LLC, Pittsburgh, PA (US)

( * ) Notice: Subject to any disclaimer, the term of this patent is extended or adjusted under 35 U.S.C. 154(b) by 53 days.

(21) Appl. No.: 10/972,722

(22) Filed: Oct. 25, 2004

(65) Prior Publication Data

US 2006/0089482 A1  Apr. 27, 2006

(51) Int. Cl.
*C08G 18/62* (2006.01)

(52) U.S. Cl. .............................. 522/96; 528/49; 528/73; 528/75

(58) Field of Classification Search .................. 528/49, 528/73, 75; 522/96
See application file for complete search history.

(56) References Cited

U.S. PATENT DOCUMENTS

| | | | |
|---|---|---|---|
| 5,719,227 A * | 2/1998 | Rosenberry et al. | 524/590 |
| 5,739,251 A | 4/1998 | Venham et al. | 528/49 |
| 5,777,024 A | 7/1998 | Killilea et al. | 524/590 |
| 6,534,128 B1 * | 3/2003 | Carlson et al. | 427/466 |

FOREIGN PATENT DOCUMENTS

DE  29 14 982  10/1980

* cited by examiner

*Primary Examiner*—Rachel Gorr
(74) *Attorney, Agent, or Firm*—Joseph C. Gil; Thomas W. Roy

(57) ABSTRACT

A radiation curable coating composition that includes from about 5 to about 70% by weight of the reaction product of i) one or more polyisocyanates, where at least 10 equivalent percent of the isocyanate groups are in the form of uretdione groups, and ii) one or more hydroxy functional lactone ester (meth)acrylates. The amount of component i), on an isocyanate equivalent basis, is equal to the amount of hydroxy equivalents of hydroxy containing materials in the composition. The composition can be used to coat substrates by coating at least a portion of the substrate with the above-described coating composition and subjecting the coated substrate to radiation.

24 Claims, No Drawings

RADIATION CURABLE COATINGS BASED ON URETDIONE POLYISOCYANATES

BACKGROUND OF THE INVENTION

1. Field of the Invention

This invention relates to radiation curable coating compositions containing ethylenically unsaturated polyurethanes and substrates coated therewith.

2. Description of the Prior Art

In the past UV coatings were touted as being 100% solids. Unfortunately, in order to achieve the desired performance properties medium-high molecular weight acrylic functional oligomers with high viscosity were developed. These materials were too viscous to be used alone and were formulated with reactive thinners, which are low molecular weight esters of acrylic or methacrylic acid. These reactive thinners have an elevated risk of toxicity and are not desired.

Recently, in order to reduce the reactive thinner content, solvent has been used to reduce the viscosity of the formulation, thus reducing the need for substantial amounts of reactive thinner. In many cases, some reactive thinner is still used in order to not exceed VOC limits and to moderate the properties of the film.

The market has repeated asked for lower viscosity oligomers in order to reduce the amount of reactive thinner and solvent. As an example, U.S. Pat. No. 5,739,251 discloses one-component coating compositions containing ethylenically unsaturated polyisocyanates which contain allophanate groups and have i) an NCO content of 5 to 25% by weight, ii) a content of β,γ-ethylenically unsaturated ether groups incorporated through allophanate groups of 0.5 to 15% by weight and iii) an allophanate group content of 1 to 30%.

As another example, U.S. Pat. No. 5,777,024 discloses an allophanate-modified urethane resin formed by reacting an allophanate-modified isocyanurate with one or more hydroxy-functional olefinic compounds, which is used in coating compositions curable by high-energy irradiation, including UV/visible light or electron beam irradiation.

DE 2 914 982 discloses hardenable compositions that include urethanes that are liquid at room temperature or are solid at room temperature and can be melted at below 60° C., which are prepared by reaching esters or polyesters containing hydroxy terminal groups with difunctional and/or polyfunctional, and optionally subsequently with monofunctional, isocyanatoalkyl and/or isocyanatoaryl compounds.

However, the above-described radiation curable coating compositions typically require high amounts of reactive thinner for application and often provide films with insufficient toughness and/or poor flexibility. Thus, there is a need in the art for radiation curable coating compositions that require lower amounts of reactive thinner for application and yield tough, flexible films.

SUMMARY OF THE INVENTION

The present invention provides a radiation curable coating composition that includes from about 5 to about 70% by weight of the reaction product of i) one or more polyisocyanates, wherein at least 10 equivalent percent of the isocyanate groups are in the form of uretdione groups, and ii) one or more hydroxy functional lactone ester (meth) acrylates (a) having a number average molecular weight of from about 200 to about 2000 and having the formula:

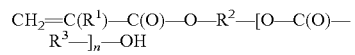

where n is an integer of from 1 to 5, $R^1$ is hydrogen or methyl, $R^2$ represents an alkylene group or substituted alkylene group having from 2 to 10 carbon atoms and which may be substituted with one or more alkyl groups having from 1 to 12 carbon atoms, and $R^3$ represents a straight or branched chain alkylene group of from 3 to 8 carbon atoms, and which may be substituted with one or more alkyl groups having from 1 to 12 carbon atoms, and where the amount of component i), on an isocyanate equivalent basis, is essentially equal to the amount of hydroxy equivalents of hydroxy containing materials in the composition.

The present invention also provides a process for preparing a coated substrate that includes coating at least a portion of the substrate with the above-described coating composition and subjecting the coated substrate to radiation.

The present invention is also directed to substrates coated according to the above-described method.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

In the present invention, it has been found that using materials with substantial amounts of uretdione provide urethane oligomers with low viscosity and when used in radiation curable coating compositions, provide tough, flexible films. Typically, the inventive isocyanates use hydroxy functional acrylates as coreactants. The resulting coating compositions require lower amounts of reactive thinner for application and yield tough, flexible films.

Acrylic functionality can be attached to an uretdione through the use of hydroxy functional acrylates according to the following formula:

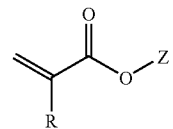

where: R is H or methyl,

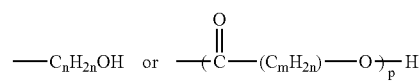

Z is where n=2 to 10, m=2 to 8, and p=1 to 10.

The —$C_nH_{2n}$— or —$C_mH_{2m}$— aliphatic groups can be linear, branched or cyclic.

In an embodiment of the invention, hydroxymethyl (meth)acrylate (HEA), hydroxypropyl (meth)acrylate (HPA), trimethylol propane di(meth)acrylate, pentaerythritol tri(meth)acrylate, GAMA ((meth)acrylic acid adduct of glycidyl (meth)acrylate), which can include the two isomers

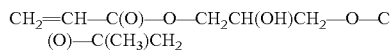

and

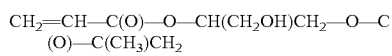

or a polycaprolactone hydroxy ethyl (meth)acrylate (PCHEA) can be used, however any hydroxyl functional (meth)acrylate can be used as described in the above defined structure.

In a particular embodiment of the invention, PCHEA is used either alone or in mixtures with other hydroxy functional (meth)acrylates to achieve low viscosity materials.

In a more particular embodiment of the invention, the PCHEA is TONE® M 100 (poly(ε-caprolactone) ester of 2-hydroxyethyl acrylate) available from DOW Chemical Corp., Midland Mich.

In another particular embodiment of the invention, HEA or HPA are useful as the sole hydroxy functional acrylate, however, in some cases, these materials tend to crystallize, so that the resin cannot be used neat, but must be dissolved. Solvents, typically ester, ether or hydrocarbon solvents can be used. Esters which are particularly useful also have acrylic functionality, such as hexanediol diacrylate, which would make the solution 100% reactive under UV/EB conditions.

Thus, in the present invention it has been found that polyisocyanates which are a mixture of uretdione and other oligomers provide low viscosity adducts with hydroxy functional acrylates. These materials can then be cured to provide tough, flexible films The present invention provides a radiation curable coating composition. The composition includes the reaction product of i) one or more polyisocyanates, where at least 50 equivalent percent of the isocyanate groups are in the form of uretdione groups, and ii) one or more hydroxy functional lactone ester (meth)acrylates.

The reaction product of i) and ii) can be prepared by reacting the polyisocyanate with the hydroxy functional lactone ester (meth)acrylates in a suitable vessel, optionally in the presence of a free radical polymerization stabilizer and optionally in the presence of a reaction catalyst. The reaction is run at a temperature sufficient for the reaction to occur in a reasonable period of time.

As used herein, the terms "(meth)acrylic" and "(meth)acrylate" are meant to include both acrylic and methacrylic acid derivatives, such as the corresponding alkyl esters often referred to as acrylates and (meth)acrylates, which the term "(meth)acrylate" is meant to encompass.

The polyisocyanates in i) are present in the present composition at a level of at least 5%, in some cases at least 10%, in other cases at least 15%, in some situations at least 20% and in other situations at least 25% by weight of the reaction product of i) and ii). Also, polyisocyanates in i) are present at up to 70%, in some case up to 60%, in other cases up to 50% and in some instances up to 40% by weight of the reaction product of i) and ii). The polyisocyanates can be present at any level or range between any of the levels recited above.

In the present invention, at least 10 equivalent percent, in some instances at least 25 equivalent percent, in other instances at least 50 equivalent percent, in some cases at least 55 equivalent percent, and in other cases at least 60 equivalent percent of the isocyanate groups in the polyisocyanate are present in the form of uretdione groups.

In an embodiment of the invention, the isocyanate i) can be an isocyanate of the structure $R^4(NCO)_2$ or a compound containing uretdione groups derived from compounds according to the structure, where $R^4$ represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms.

In a particular embodiment of the invention, the polyisocyanate includes DESMODUR® N 3400, a polyisocyanate available from Bayer Material Science, Pittsburgh, Pa.

In a further embodiment of the invention, the isocyanate i) includes the uretdione dimer/isocyanurate trimer of hexamethylene diisocyanate, where the equivalent ratio of dimer to trimer is from 20:80 to 80:20, in some cases from 30:70 to 70:30, in other cases from 60:40 to 40:60, in some instances from 20:80 to 60:40, and in other instances from 40:60 to 80:20.

The one or more hydroxy functional lactone ester (meth)acrylates (a) generally conform to the formula:

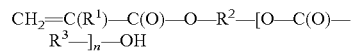

where n is an integer of from 1 to 10, in some cases 1 to 5, in other cases 1 to 4, in some situations 2 or 3, and in other situations 2 to 4; $R^1$ is hydrogen or methyl; $R^2$ represents an alkylene group or substituted alkylene group having from 2 to 10, in some cases 2 to 6, and in other cases 2 to 4 carbon atoms and which may be substituted with one or more alkyl groups having from 1 to 12, in some cases 1 to 8, and in other cases 1 to 6 carbon atoms, and $R^3$ represents a straight or branched chain alkylene group of from 3 to 8, in some cases 3 to 6, and in other cases 4 to 6 carbon atoms, and which may be substituted with one or more alkyl groups having from 1 to 12, in some cases 1 to 8, and in other cases 1 to 6 carbon atoms.

In a particular embodiment of the invention, the hydroxy functional lactone ester (meth)acrylate has n=2, $R^1$ is hydrogen or methyl, $R^2$ is an alkylene group having 2 to 3 carbon atoms, and $R^3$ is a straight chain alkylene group of from 3 to 5 carbon atoms.

The one or more hydroxy functional lactone ester (meth)acrylates typically have a number average molecular weight (Mn) of at least 200, in some cases at least 250, and in other cases at least 300. Also, the Mn of the hydroxy functional lactone ester (meth)acrylates can be up to 2,000, in some cases up to 1,500, in other cases up to 1,250, and in other cases up to 1,000.

Molecular weight values recited in this application can be determined either by gel permeation chromatography using polystyrene or sulfonated polystyrene standards. In the case of Mn, the values can alternatively be determined by titrating functional groups using titration methods known in the art.

In the present invention, the equivalent ratio of isocyanate groups in i) and hydroxy groups in ii) can be from 1:3 to 3:1, in some cases 1:2 to 2:1, and in other cases from 1:1.5 to 1.5:1. In an embodiment of the invention, the amount of component i), on an isocyanate equivalent basis, is essentially equal to the amount of hydroxy equivalents of hydroxy containing materials in the composition.

In an aspect of the present invention, component ii) can further include one or more hydroxy functional (meth) acrylate esters (b) according to the formula:

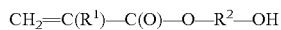

$CH_2=C(R^1)-C(O)-O-R^2-OH$ where $R^1$ and $R^2$ are as defined above.

The weight ratio of (a) to (b) can be at least 1:10, in some cases at least 1:7, in other cases at least 1:6, in some instances at least 1:5, in other instances at least 1:3, and in some circumstances at least 1:2. Also, the weight ratio of (a) to (b) can be up to 10:1, in some cases up to 7:1, in other cases up to 6:1, in some instances up to 5:1, in other instance up to 3:1, and in some circumstances up to 2:1. The weight ratio of (a) to (b) can be any value or range between any of the values recited above.

The radiation curable coating composition of the present invention can also optionally include reactive diluents. The reactive diluents can be present in the composition at from 0 to 40%, in some cases from 0 to 25%, in other cases from 0.1 to 40%, in some situations from 0.5 to 35%, in other situations from 1 to 35% m and in some instances from 1 to 25% by weight of the composition.

Any suitable reactive diluent can be used in the present composition. Suitable reactive diluents include, but are not limited to alkyl mono-, di- tri- and tetra (meth)acrylates, wherein said alkyl is an alkyl group of from 1 to 8 carbon atoms.

The radiation curable coating composition of the present invention can also optionally include photoinitiators. The photoinitiators can be present in the composition at from 0 to 10%, in some cases from 0.1 to 10%, in other cases from 0.1 to 5%, in some situations from 0.5 to 5%, in other situations from 0.1 to 3%, and in some instances from 0.1 to 2.5% by weight of the composition.

Any suitable photoinitiator can be used in the present composition. Suitable photoinitiators include, but are not limited to monoacylphosphine oxide (MAPO), bis-acylphosphineoxides (BAPO), alpha-hydroxyketone, benzildimethyl ketal (BDK), benzophenone and derivatives thereof, non-limiting examples being diphenoxy benzophenone, halogenated and amino functional benzophenones, 2-hydroxy-2-methylphenol-1-propanone, fluorenone derivatives such as 2,2-diethoxyacetophenone, anthraquinone derivatives such as 2-benzyl-2-N, N-dimethylamino-1-(4-morpholinophenyl) butanone, zanthone derivatives such as halogenated acetophenone, thioxanthone derivatives such as sulfonyl chlorides of aromatic compounds, camphorquinone, acylphosphine oxides, bis-acyl phosphine oxides, benzyl, benzimidazoles, benzoin ethers such as benzoin isopropyl ether, and hydroxyalkyl phenones such as 1-phenyl-2-hydroxy-2-methylpropan-1-one. Suitable photoinitiators also include, but are not limited to those available under the tradenames DAROCURE® and IRGACURE® from Ciba Specialty Chemicals Corp., Tarrytown, N.Y.

The present composition can further include solvents or solvent mixtures. The solvents can be present at from about 5 to about 95%, in some cases from about 10 to about 85%, in other cases from about 15 to about 75%, in some instances from about 20 to about 70%, and in other instances from about 25 to about 65% by weight, based on the weight of the composition.

Non-limiting examples of suitable solvents that can be used in the curable coating composition include ether or hydrocarbon solvents, esters hydrocarbon solvents, a non-limiting example being butyl acetate, and those that have acrylic functionality, a non-limiting example being hexanediol diacrylate, acetone, butanone, tetrahydrofuran, dioxane, acetonitrile, dipropylene glycol dimethyl ether and 1-methyl-2-pyrrolidone.

In an embodiment of the invention, the radiation curable composition includes:
from about 15 to about 60%, in some cases from about 20 to about 55%, and in other cases from about 25 to about 50% by weight of the reaction product of i) and ii);
from about 10 to about 25%, in some cases about 12.5% to about 22.5%, and in other cases from about 15% to about 20% by weight of reactive diluents selected from alkyl mono-, di- tri- and tetra (meth) acrylates, wherein the alkyl is an alkyl group of from 1 to 8 carbon atoms;
from about 3% to about 7%, in some case from about 3.5% to about 6.5%, and in other cases from about 4% to about 6% by weight of one or more photoinitiators as described above, and
from about 0 to about 70%, in some cases from about 20% to about 65%, in other cases from about 40% to 65%, and in some instances from about 50% to about 60% by weight of a solvent or solvent mixture.

The present composition can further include other additives typically used in coating compositions. Suitable additives include, but are not limited to light stabilizers, UV absorbers, antioxidants, fillers, antisettling agents, antifoam agents, wetting agents, flow control agents, thixotropes, reactive thinners, plasticizers, solvents, thickeners, pigments, dyes, flatting agents and combinations thereof.

The present invention also provides a process for preparing a coated substrate that includes coating at least a portion of the substrate with the above-described coating composition and subjecting the coated substrate to radiation for a time sufficient to cure the composition.

The coating compositions can be used to coat substrates of any kind, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented.

After the evaporation of any inert solvents used, the coatings may be crosslinked either by high-energy radiation, such as UV light, electron beams, or γ-rays, by heating to elevated temperatures in the presence of peroxides or azo compounds, or by curing with metal salts of siccative acids and optionally (hydro)peroxides at either elevated temperatures or at temperatures of room temperature or below. When the coatings are crosslinked by UV irradiation, photoinitiators are added to the coating composition.

When curing the coating compositions at elevated temperatures, curing must be conducted in the presence of 0.1 to 10%, in some cases 0.1 to 5% by weight, based on the weight of the composition, of initiators such as peroxides or azo compounds. Temperatures of 80° to 240° C., in some cases 120° to 160° C., are needed to cure the coating compositions at elevated temperatures.

Suitable initiators include, but are not limited to the known free-radical initiators, e.g., aliphatic azo compounds such as azodiisobutyronitrile, azo-bis-2-methylvaleronitrile, 1,1'-azo-bis-1-cyclohexanenitrile and alkyl 2,2'-azo-bisisobutyrates; symmetrical diacyl peroxides such as acetyl, propionyl or butyryl peroxide, benzoyl peroxides substituted by bromo, nitro, methyl or methoxy groups, and lauryl peroxides; symmetrical peroxydicarbonates such as diethyl, diisopropyl, dicyclohexyl and dibenzoyl peroxydicarbonate; tert-butyl peroxy-2-ethylhexanoate and tert-butyl perbenzoate; hydroperoxides such as tert-butyl hydroperoxide and cumene hydroperoxide; and dialkyl peroxides such as dicumyl peroxide, tert-butyl cumyl peroxide or ditert-butyl peroxide.

The coating compositions according to the invention may also be cured at room temperature in the presence of siccatives and optionally (hydro)peroxides. Suitable siccatives are known and include metal salts, preferably cobalt or vanadium salts, of acids such as linseed oil fatty acids, tall oil fatty acids and soybean oil fatty acids; resinic acids such as abietic acid and naphthenic acid; acetic acid; isooctanoic acid; and inorganic acids such as hydrochloric acid and sulfuric acid. Cobalt and vanadium compounds which are soluble in the coating compositions and act as siccatives are particularly suitable and include salts of the acids mentioned above. The siccatives are generally used in the form of organic solutions in quantities such that the metal content is 0.0005 to 1.0% by weight, preferably 0.001 to 0.5% by weight, based on the weight of the ethylenically unsaturated polyurethanes.

Examples of (hydro)peroxides include di-tert.-butyl peroxide, benzoyl peroxide, cyclohexanone peroxide, methyl ethyl ketone peroxide, acetyl acetone peroxide, dinonyl peroxide, bis-(4-tert.-butylcyclohexyl)-peroxydicarbonate, tert.-butyl hydroperoxide, cumene hydroperoxide, 2,5-dimethyl-hexane-2,5-hydroperoxide and diisopropyl benzene monohydroperoxide. The (hydro)peroxides are preferably used in quantities of 1 to 10% by weight, based on the weight of the ethylenically unsaturated polyurethanes.

In a particular embodiment, the resins are combined with one or more photoinitiators, mixed and optionally diluted with a solvent. The formulations are applied to a substrate as wet films having a thickness of from 1 to 15 mil. The wet film is then exposed to radiation for a period of time sufficient to cure the film.

In the present process, the radiation can be UV radiation, visible light, electron beam radiation or combinations thereof.

In many instances, the radiation has a wavelength of at least 300 nm. In some cases, the radiation has a wavelength of from about 320 to about 450 nm.

The resulting coating films are tough, flexible films. As a non-limiting example, the coating films provided by the present invention have a pendulum hardness of at least 30, in some cases at least 33, and in other cases at least 35 seconds. The pendulum hardness of the cured coating film can be determined using ASTM D 4366-95 (Test Method A)-Standard Test Methods for hardness of Organic Coatings by Pendulum Damping Tests using a Koenig Hardness Instrument.

The present invention also provides substrates coated according to the above-described method.

The present invention will further be described by reference to the following examples. The following examples are merely illustrative of the invention and are not intended to be limiting. Unless otherwise indicated, all percentages are by weight.

EXAMPLES

Raw Materials

Uretdione=DESMODUR® N 3400 polyisocyanate available from Bayer Material Science, Pittsburgh, Pa. Uretdione dimer/isocyanurate trimer ratio of ~60/40 eq/eq. Isocyanate equivalent weight=193.

PCHEA=TONE® M 100 (poly(ε-caprolactone) ester of 2-hydroxyethyl acrylate) available from DOW Chemical Corp., Midland Mich. Hydroxyl equivalent weight=344

HEA=hydroxyethyl acrylate. Hydroxyl equivalent weight=116.

HPA=hydroxypropyl acrylate. Hydroxyl equivalent weight=130.

Example 1

Preparation of Uretdione Adduct of PCHEA.

Into a three liter round bottom flask fitted with stirrer, heater, dropping funnel and oxygen inlet tube was added 719 g (3.7 eq.) Desmodur N 3400 polyisocyanate, 1281 g (3.7 eq.) PCHEA and 10 g butylated hydroxy toluene stabilizer. The mixture was agitated until homogenous when 2 g dibutyltin dilaurate catalyst was added. The reaction mixture was then heated to 60° C. and held at this temperature for six hours when no isocyanate was detected in an IR spectrum. The viscosity was 5175 mPa·sec and the density was 9.4 lbs/gal.

Example 2

Preparation of Uretdione Adduct of PCHEA.

Into a two liter round bottom flask fitted with stirrer, heater, dropping funnel and oxygen inlet tube was added 360 g (1.86 eq.) Desmodur N 3400 polyisocyanate, 641 g (1.86 eq.) PCHEA and 5 g butylated hydroxy toluene stabilizer. The mixture was agitated until homogenous when 1 g dibutyltin dilaurate catalyst was added. The reaction mixture was then heated to 60° C. and held at this temperature for six hours when no isocyanate was detected in an IR spectrum. The viscosity was 6094 mPa·sec and the density was 9.4 lbs/gal.

Example 3

Preparation of Uretdione Adduct of PCHEA and HEA.

Into a two liter round bottom flask fitted with stirrer, heater, dropping funnel and oxygen inlet tube was added 405 g (2.1 eq.) Desmodur N 3400 polyisocyanate, 530 g (1.54 eq.) PCHEA, 65 g (0.56 eq.) HEA and 5 g butylated hydroxy toluene stabilizer. The mixture was agitated until homogenous when 1 g dibutyltin dilaurate catalyst was added. The reaction mixture was then heated to 60° C. and held at this temperature for six hours when no isocyanate was detected in an IR spectrum. The viscosity was 5720 mPa·sec and the density was 9.47 lbs/gal.

Example 4

Preparation of Uretdione Adduct of PCHEA and HEA.

Into a two liter round bottom flask fitted with stirrer, heater, dropping funnel and oxygen inlet tube was added 419 g (2.17 eq.) Desmodur N 3400 polyisocyanate, 497 g (1.45 eq.) PCHEA, 84 g (0.72 eq.) HEA and 5 g butylated hydroxy toluene stabilizer. The mixture was agitated until homogenous when 1 g dibutyltin dilaurate catalyst was added. The reaction mixture was then heated to 60° C. and held at this temperature for six hours when no isocyanate was detected in an IR spectrum. The viscosity was 6310 mPa·sec and the density was 9.48 lbs/gal.

Example 5

Preparation of Uretdione Adduct of PCHEA and HEA.

Into a five liter round bottom flask fitted with stirrer, heater, dropping funnel and oxygen inlet tube was added 1938 g (10 eq.) Desmodur N 3400 polyisocyanate, 2073 g (6 eq.) PCHEA, 466 g (4 eq.) HEA and 22 g butylated hydroxy toluene stabilizer. The mixture was agitated until homogenous when 1 g dibutyltin dilaurate catalyst was added. The reaction mixture was then heated to 60° C. and held at this temperature for six hours when no isocyanate was detected in an IR spectrum. The viscosity was 7300 mPa·sec and the density was 9.46 lbs/gal.

Example 6

Preparation of Uretdione Adduct of PCHEA and HEA.

Into a five liter round bottom flask fitted with stirrer, heater, dropping funnel and oxygen inlet tube was added 215.4 g (1.12 eq.) Desmodur N 3400 polyisocyanate, 230.3 g (0.67 eq.) PCHEA, 52 g (0.45 eq.) HEA and 2.5 g butylated hydroxy toluene stabilizer. The mixture was agitated until homogenous when 0.25 g dibutyltin dilaurate catalyst was added. The reaction mixture was then heated to 60° C. and held at this temperature for six hours when no isocyanate was detected in an IR spectrum. The viscosity was 5860 mPa·sec.

Example 7

Preparation of Uretdione Adduct of PCHEA and HPA.

Into a five liter round bottom flask fitted with stirrer, heater, dropping funnel and oxygen inlet tube was added 213 g (1.1 eq.) Desmodur N 3400 polyisocyanate, 227.5 g (0.66 eq.) PCHEA, 57.4 g (0.44 eq.) HPA and 2.5 g butylated hydroxy toluene stabilizer. The mixture was agitated until homogenous when 0.25 g dibutyltin dilaurate catalyst was added. The reaction mixture was then heated to 60° C. and held at this temperature for six hours when no isocyanate was detected in an IR spectrum. The viscosity was 7150 mPa·sec.

Example 8

Preparation of Uretdione Adduct of PCHEA and HEA.

Into a two liter round bottom flask fitted with stirrer, heater, dropping funnel and oxygen inlet tube was added 565 g (2.93 eq.) Desmodur N 3400 polyisocyanate, 144 g (0.42 eq.) PCHEA, 291 g (2.5 eq.) HEA and 5 g butylated hydroxy toluene stabilizer. The mixture was agitated until homogenous when 0.1 g dibutyltin dilaurate catalyst was added. The reaction mixture was then heated to 60° C. and held at this temperature for six hours when no isocyanate was detected in an IR spectrum. The viscosity was 13,600 mPa·sec and the density was 9.48 lbs/gal.

Formulation, Cure Procedure and Testing

Resins were combined with 5 phr (by weight) of photoinitiator DAROCURE® 4265 (Ciba Specialty Chemicals Corp., Tarrytown, N.Y.) and 1 phr (by weight) of photoinitiator IRGACURE® 184 (Ciba Specialty Chemicals Corp.,). The formulation was mixed until homogenous and diluted to 85% solids with butyl acetate. Formulations were formed into films using a 4 mil wet film thickness draw down bar on both cold rolled steel panels for MEK double rub evaluations and glass panels for pendulum hardness evaluations. All panels were flashed for 30 seconds after draw down and cured for two minutes under a H&S Autoshot 400A Low Intensity UVA lamp (H&S Autoshot, Georgetown, ON) at a lamp distance of 10 inches.

MEK double rubs were done using a two pound ball peen hammer covered with several layers of cheesecloth. The cheesecloth was saturated with MEK. The MEK-wet hammer was placed on the coating surface such that the hammer is at a 90° angle to the surface. Without applying downward pressure, the hammer was pushed back and forth over approximately 4" long area of the coating. One forward and back motion is counted as one double-rub. The cloth was saturated with MEK after every twenty-five double rubs. The end-point was when the hammer broke through the substrate to the panel surface.

The pendulum hardness was determined using ASTM D 4366-95 (Test Method A)-Standard Test Methods for hardness of Organic Coatings by Pendulum Damping Tests using a Koenig Hardness Instrument.

| | Example coating | | | | | | |
|---|---|---|---|---|---|---|---|
| | A | B | C | D | E | F | G |
| Example resin | 1 | 2 | 3 | 4 | 5 | 6 | 8 |
| Ingredient (eq. ratios) | | | | | | | |
| Uretdione | 1.0 | 1.0 | 3.0 | 3.0 | 3.0 | 3.0 | 7.0 |
| PCHEA | 1.0 | 1.0 | 2.2 | 2.0 | 1.8 | 1.8 | 1.0 |
| HEA | 0.0 | 0.0 | 0.8 | 1.0 | 1.2 | 1.2 | 6.0 |
| Performance properties | | | | | | | |
| MEK double rubs | 42 | 45 | 35 | 30 | 30 | 35 | 100 |
| Pendulum Hardness (sec) | 36 | 31 | 42 | 41 | 38 | 36 | 43 |

The data demonstrate that the radiation curable coating compositions of the present invention have a desirable viscosity, provide tough, flexible films while not requiring excessive amounts of reactive thinner.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A radiation curable coating composition comprising the reaction product of
   i) one or more polyisocyanates, wherein at least 10 equivalent percent of the isocyanate groups are in the form of uretdione groups, and
   ii-a) one or more hydroxy functional lactone ester (meth)acrylates having a number average molecular weight of from about 200 to about 2000 and having the formula:

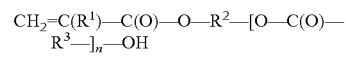

wherein
n is an integer of from 1 to 5,
$R^1$ is hydrogen or methyl,
$R^2$ represents an alkylene group or substituted alkylene group having from 2 to 10 carbon atoms and which may be substituted with one or more alkyl groups having from 1 to 12 carbon atoms, and
$R^3$ represents a straight or branched chain alkylene group of from 3 to 8 carbon atoms, and which may be substituted with one or more alkyl groups having from 1 to 12 carbon atoms, and ii-b) one or more hydroxy functional (meth)acrylate esters according to the formula:

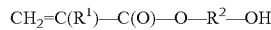

$CH_2=C(R^1)-C(O)-O-R^2-OH$ wherein $R^1$ and $R^2$ are as defined above, and
wherein the amount of component i), on an isocyanate equivalent basis, is essentially equal to the amount of hydroxy equivalents of hydroxy containing materials in the composition.

2. The composition according to claim 1, wherein said reaction product is present in an amount of about 5 to about 70% by weight, based on the weight of the composition.

3. The composition according to claim 1 further comprising one or more reactive diluents selected from the group consisting of alkyl mono-, di- tri- and tetra (meth)acrylates, wherein said alkyl is an alkyl group of from 1 to 8 carbon atoms.

4. The composition according to claim 1 further comprising from about 0.1 to about 10% by weight of one or more photoinitiators per PTO query response.

5. The composition according to claim 1 further comprising from about 5 to about 95% by weight, based on the weight of the composition of a solvent or solvent mixture.

6. The composition according to claim 1, wherein the weight ratio of (a) to (b) is from about 1:10 to about 10:1.

7. The composition of claim 1 comprising from about 15 to about 60% by weight of the reaction product of i) and ii), from about 10 to about 25% by weight of reactive diluents selected from the group consisting of alkyl mono-, di- tri- and tetra (meth)acrylates, wherein said alkyl is an alkyl group of from 1 to 8 carbon atoms, from about 3 to about 7% by weight of one or more photoinitiators, and from about 40 to about 70% by weight of a solvent or solvent mixture.

8. The composition of claim 1 wherein said isocyanate i) is an isocyanate of the structure $R^4(NCO)_2$ or a compound containing uretdione groups derived from compounds of said structure, wherein $R^4$ represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms.

9. The composition of claim 1 wherein said isocyanate i) is the uretdione dimer/isocyanurate trimer of hexamethylene diisocyanate, wherein the equivalent ratio of dimer to trimer is from 20:80 to 80:20.

10. The composition of claim 1, wherein in said hydroxy functional lactone ester (meth)acrylate
n=2,
$R^1$ is hydrogen or methyl,
$R^2$ is an alkylene group having 2 to 3 carbon, atoms, and
$R^3$ is a straight chain alkylene group of from 3 to 5 carbon atoms.

11. A process for preparing a coated substrate comprising coating at least a portion of the substrate with a coating composition and subjecting the coated substrate to radiation for a time sufficient to cure the composition, wherein the coating composition comprises the reaction product of i) one or more polyisocyanates, wherein at least 50 equivalent percent of the isocyanate groups are in the form of uretdione groups, and ii-a) one or more hydroxy functional lactone ester (meth)acrylates having a number average molecular weight of from about 200 to about 2000 and having the formula:

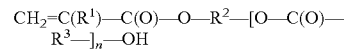

$CH_2=C(R^1)-C(O)-O-R^2-[O-C(O)-R^3-]_n-OH$ wherein
n is an integer of from 1 to 5,
$R^1$ is hydrogen or methyl,
$R^2$ represents an alkylene group or substituted alkylene group having from 2 to 10 carbon atoms and which may be substituted with one or more alkyl groups having from 1 to 12 carbon atoms, and
$R^3$ represents a straight or branched chain alkylene group of from 3 to 8 carbon atoms, and which may be substituted with one or more alkyl groups having from 1 to 12 carbon atoms, and ii-b) one or more hydroxy functional (meth)acrylate esters according to the formula:

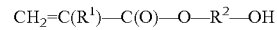

$CH_2=C(R^1)-C(O)-O-R^2-OH$ wherein $R^1$ and $R^2$ are as defined above, and
wherein the amount of component i), on an isocyanate equivalent basis, is essentially equal to the amount of hydroxy equivalents of hydroxy containing materials in the composition.

12. The process according to claim 11, wherein said reaction product is present in an amount of about 5 to about 70% by weight, based on the weight of the composition.

13. The process according to claim 11, wherein the coating composition further comprises one or more reactive diluents selected from the group consisting of alkyl mono-, di- tri- and tetra (meth)acrylates, wherein said alkyl is an alkyl group of from 1 to 8 carbon atoms.

14. The process according to claim 11, wherein the coating composition further comprises from about 0.1 to about 10% by weight of one or more photoinitiators per PTO query response.

15. The process according to claim 11, wherein the coating composition further comprises from about 5 to about 95% by weight, based on the weight of the composition of a solvent or solvent mixture.

16. The process according to claim 11 wherein the weight ratio of (a) to (b) is from about 1:10 to about 10:1.

17. The process according to claim 11, wherein the coating composition comprises from about 15 to about 60% by weight of the reaction product of i) and ii), from about 10 to about 40% by weight of reactive diluents selected from the group consisting of alkyl mono-, di- tri- and tetra (meth)acrylates, wherein said alkyl is an alkyl group of from 1 to 8 carbon atoms, from about 3 to about 7% by weight of one or more photoinitiators, and from about 40 to about 70% by weight of a solvent or solvent mixture.

18. The process according to claim 11 wherein the isocyanate i) is an isocyanate of the structure $R^4(NCO)_2$ or a compound containing uretdione groups derived from compounds of said structure, wherein $R^4$ represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms.

19. The process according to claim 11 wherein said isocyanate i) is the uretdione dimer/isocyanurate trimer of hexamethylene diisocyanate, wherein the equivalent ratio of dimer to trimer is from 50:50 to 70:30.

20. The process according to claim 11, wherein in said hydroxy functional lactone ester (meth)acrylate
n=2,
$R^1$ is hydrogen or methyl,
$R^2$ is an alkylene group having 2 to 3 carbon, atoms, and
$R^3$ is a straight chain alkylene group of from 3 to 5 carbon atoms.

21. The process according to claim 11, wherein said radiation is selected from UV radiation, visible light, and electron beam radiation.

22. The process according to claim 21, wherein said radiation has a wavelength of at least 300 nm.

23. The process according to claim 21, wherein said radiation has a wavelength of from about 320 to about 450 nm.

24. Substrates coated according to the method of claim 11.

* * * * *